No. 837,641. PATENTED DEC. 4, 1906.
H. A. POPPENHUSEN.
MECHANICAL STOKING GRATE.
APPLICATION FILED SEPT. 20, 1904.

Witnesses:
Inventor:
Herman A. Poppenhusen
by Poole & Brown his Attys.

No. 837,641. PATENTED DEC. 4, 1906.
H. A. POPPENHUSEN.
MECHANICAL STOKING GRATE.
APPLICATION FILED SEPT. 20, 1904.

Witnesses:
Inventor:
Herman A. Poppenhusen
By Poole & Brown his Attys

No. 837,641. PATENTED DEC. 4, 1906.
H. A. POPPENHUSEN.
MECHANICAL STOKING GRATE.
APPLICATION FILED SEPT. 20, 1904.

Witnesses
H. G. Barrett
W. H. Hall

Inventor
Herman A. Poppenhusen
by Poole & Brown his Attys

No. 837,641. PATENTED DEC. 4, 1906.
H. A. POPPENHUSEN.
MECHANICAL STOKING GRATE.
APPLICATION FILED SEPT. 20, 1904.

No. 837,641. PATENTED DEC. 4, 1906.
H. A. POPPENHUSEN.
MECHANICAL STOKING GRATE.
APPLICATION FILED SEPT. 20, 1904.

No. 837,641. PATENTED DEC. 4, 1906.
H. A. POPPENHUSEN.
MECHANICAL STOKING GRATE.
APPLICATION FILED SEPT. 20, 1904.

Inventor
Herman A. Poppenhusen
by Poole & Brown
his Attys

# UNITED STATES PATENT OFFICE.

HERMAN A. POPPENHUSEN, OF EVANSTON, ILLINOIS.

MECHANICAL-STOKING GRATE.

No. 837,641.

Specification of Letters Patent.

Patented Dec. 4, 1906.

Application filed September 20, 1904. Serial No. 225,204.

*To all whom it may concern:*

Be it known that I, HERMAN A. POPPENHUSEN, of Evanston, in the county of Cook and State of Illinois, have invented certain new and useful Improvements in Mechanical-Stoking Grates; and I do hereby declare that the following is a full, clear, and exact description thereof, reference being had to the accompanying drawings, and to the letters of reference marked thereon, which form a part of this specification.

This invention relates to mechanical stokers or devices which operate to effect the continuous movement or feed of the layer of fuel resting on the grate along the supporting-surface of the grate in a direction from the feed-opening of the furnace inwardly or toward the interior thereof; and it embraces a mechanical-stoking grate in which the grate-bars have a combined reciprocatory and rocking movement.

The invention consists in the matters hereinafter described, and pointed out in the appended claims.

In the accompanying drawings I have illustrated as applied to a steam-boiler furnace a mechanical-stoking grate embodying my invention in the best form in which I have as yet been able to devise the same; but it is to be understood that said drawings illustrate only one of various forms in which a structure embodying the essential features of my invention may be constructed.

As illustrated in said drawings.

As illustrated in said drawings, A A indicate the side walls of the furnace, A' the bridge-wall at the rear of the furnace, A² an ignition or combustion arch which extends across the forward part of the furnace adjacent to the feed-opening thereof, and A³ a wall which rises from the rear margin of the ignition-arch A².

B indicates a steam-boiler of the water-tube type, having a head B' and water-tubes *b b*. The head B' is shown as being located over and in contact with the wall A³ and the water-tubes *b b* as extending rearwardly therefrom over the bridge-wall A'.

C indicates a feed-hopper by which fuel is fed to the forward or feed opening of the furnace and is supplied in a uniform layer to the grate. Said feed-hopper embraces two parallel side plates C' C' and an oblique or inwardly-inclined front plate C², which extends between and is connected at its side margins with the side plates C' C'. The side plates C' C' are shown as being extended downwardly to the floor-level and as forming supports for some of the operative parts of the grate mechanism.

D indicates a sliding gate or fuel-door located over the feed-opening of the furnace between the front end of the ignition-arch A² and the fuel-hopper C. Said gate D, as shown, consists of a transverse girder D', to the rear face of which is secured a row of fire-brick *d*, said fire-brick being located between the girder D' and the front edge of the ignition-arch A². A plate d' is attached to the outer face of the girder D' and extends downwardly and inwardly to the lower margins of the fire-brick d. Said plate d' forms the rear wall of the hopper C. The ends of the said gate D are supported in suitable guides formed on the inner face of the side plate C' of the feed-hopper.

The grate of the furnace illustrated is located within the furnace, with its forward end extending outwardly therefrom beneath the feed-hopper, and said grate, as shown, is arranged horizontally, although it may be more or less inclined from front to rear, either downwardly or upwardly, if desired.

E E E indicate the grate-bars, which form the fuel-supporting surface of the grate. The said grate-bars are arranged in rows, extending from the front to the rear of the furnace, with the individual bars parallel with the side walls of the furnace and the bars in each row in end-to-end relation. Said bars have severally both an endwise reciprocatory and a rocking movement, and all of the bars in each row are adapted to move together in their endwise reciprocation, while the bars in each row have a simultaneous rocking movement, by which their rear ends are alternately lifted above and dropped to the general level of the fuel-supporting surface of the grate. Moreover, the bars in the alternate, or first, third, fifth, seventh, and ninth, &c., rows of bars constitute a set of bars which are connected and move together, while the bars in the intermediate, or second, fourth, sixth, eighth, tenth, &c., rows likewise constitute a set of bars which are connected and move together, while the movements of the bars in each set take place in alternation with the movements of the bars in the other set. Furthermore, the devices for giving reciprocatory and rocking movement to the grate-bars are so arranged that the rear ends of all of the bars in each set will be elevated when the bars are moving rearwardly and depressed when the bars are moving forwardly, and also in such manner that when the bars of one set are elevated at their rear ends the bars of the other set, constituting the intermediate rows of bars, will be depressed, with the result that when the rows of bars constituting either set of bars are rocked to carry their rear ends upwardly said rear ends will enter the layer of fuel on the grate and in the rearward movement of that set will carry the fuel rearwardly over the intermediate bars of the other set, which at that time will be in their depressed positions. Now referring to the means by which the said grate-bars are supported, each bar E is provided with a downwardly-extending supporting-arm E', which is rigidly attached thereto and by which it is pivotedly or movably sustained in such manner that when it is swung or oscillated about the pivot of said arm E' its rear end will have a greater vertical movement than its front end.

F F indicate a set of endwise-movable supporting-bars which are arranged side by side in parallel relation and to which are pivoted the lower ends of the supporting-arms E' E' of the grate-bars, constituting the first, third, fifth, seventh, &c., rows of bars. F' F' indicate a like set of supporting-bars arranged parallel with and between the bars F F and to which are pivoted the lower ends of the supporting-arms E' E', belonging to the intermediate or second, fourth, sixth, eighth, &c., rows of grate-bars. The pivots joining the lower ends of the arms E' E' with the bars F and F' are located beneath or nearly beneath the forward ends of the bars, so that when the bars are rocked forwardly and upwardly from the horizontal position thereof the rear ends of the bars will be lifted above the general level of the top of the grate, while their forward ends will have little or no vertical movement. The individual bars are, moreover, made of such depth or width vertically at their rear ends that when said rear ends are elevated above the front ends of adjacent bars the rear edges of the bars will still extend below or overlap the said front ends of adjacent bars, and no openings or spaces will be left between the ends of adjacent bars when the rear ends of the bars are so elevated. As shown and preferably made, the bars are much wider at their rear than at their forward ends, or of generally triangular form, as seen in side view. The set of supporting-bars F F F are rigidly connected at their ends, so as to form a grid, which is given reciprocatory movement in a direction endwise of the individual bars, so that the said set of bars F F F constitute supports for and means for giving endwise reciprocatory movement to the set of grate-bars supported thereby or connected therewith. Likewise the set of supporting-bars marked F' F' F' are rigidly connected to form a grid and likewise have endwise reciprocatory movement. In a plane at some distance below that of the bars F' F' F' is located a set of bars G G G and a set of intermediate bars G' G' G', the bars constituting each of said sets of bars being connected at their ends to form two separately-movable grids in the same manner as in the case of the sets of bars F F and F' F' F'. The supporting-bars G' and G are severally connected with the individual grate-bars above them by means of links E², which are pivoted at their upper ends to the said grate-bars at points at the rear of the upper ends of the arms E' and are pivoted at their lower ends to said bars G and G'. The two upper sets of bars F F' and the two lower sets of bars G G' together constitute supports for the grate-bars connected therewith, and also through the endwise movement of both the upper and lower sets of bars constitute means for transmitting endwise reciprocatory movement to the said grate-bars. Said arms E' and links E² are relatively so arranged that when the said bars G or G' are moved forwardly relatively to the associated upper bars F or F' the grate-bars will be tilted rearwardly on the pivots of the arms E', but when the said bars G or G' are moved rearwardly relatively to the bars F or F' the grate-bars will be tilted forwardly on said pivots. It follows that the two sets of upper and lower bars F F' and G G' also serve, through the relative endwise movement thereof, to give rocking movement to the grate-bars.

Figures 5, 6, 7, 8, 9:
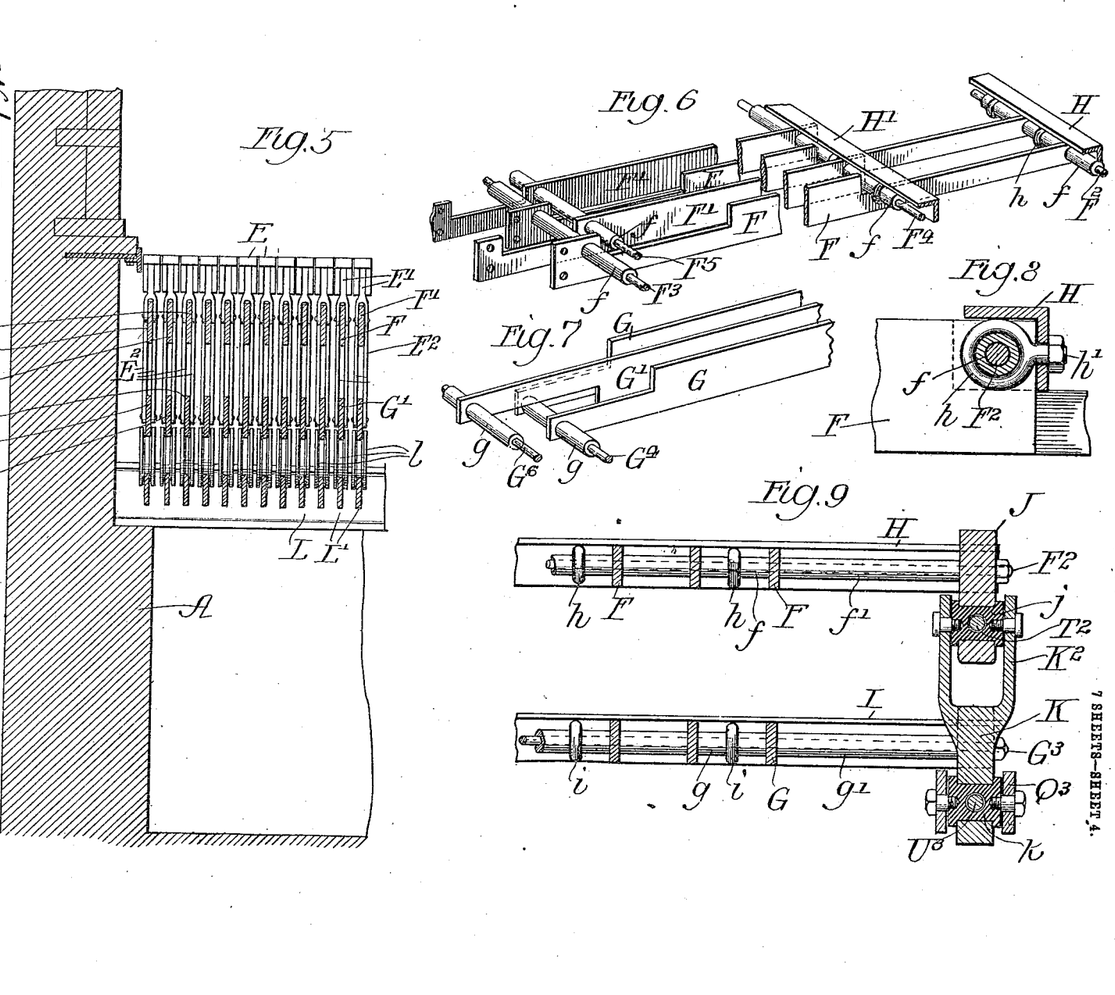
Fig. 5 is a detail transverse section through a part of the grate and one of the side walls of the furnace, taken on line 5 5 of Fig. 1.
Fig. 6 is a detail perspective view of some of the bars of the upper sets of supporting-bars by which the grate-bars are sustained and actuated.
Fig. 7 is a like detail perspective view of the rear ends of some of the bars of the lower sets of supporting-bars.
Fig. 8 is an enlarged detail sectional view showing in side elevation the forward ends of two adjacent supporting-bars, illustrating the means for connecting the same with the devices by which said supporting-bars are given endwise movement.
Fig. 9 is a detail cross-section taken upon line 9 9 of Fig. 3.

Referring to the details of construction illustrated in the connecting means between the grate-bars and the supporting-bars F F' and G G', Fig. 5, the arms E' on the grate-bars are split or forked at their lower ends to embrace the bars F F', which are vertically wide and flat, and said arms are connected with the said bars F F' by pivots extending through the bars and through the lower ends of the forks of said arms. The links E² are arranged in pairs, with the two bars of each pair pivoted to a single grate-bar and extending downwardly at opposite sides of the upper bars F F'. The lower ends of the two bars of each pair overlap the bars G G' at their lower ends and are connected with the latter by pivots which pass horizontally through the said bars G G' and said links. At their upper ends the two links E² E² of each pair are arranged at opposite sides of an apertured lug e, which projects downwardly from the under surface of the grate-bar E and which is preferably made integral with the arm E' in a manner and for a purpose more particularly hereinafter described.

Now referring to the means for joining or connecting with each other to form the grids hereinbefore referred to the individual bars constituting the four sets of bars F F F' F' G G G' G', these features are more clearly shown in Figs. 6 to 9 and are constructed as follows: The bars F F are joined at their forward and rear ends by cross-rods F² F³, while the bars F' F' are likewise connected by cross-rods F⁴ F⁵. The rods F² F³ F⁴ F⁵ are shown as made of cylindric form and provided between the several bars F F and F' F' with tubular spacing sleeves or thimbles f f. For convenience in construction the bars F and F' are preferably made of the same width and arranged with their upper and lower edges in the same planes, and to avoid interference of the cross-rods F² F³ F⁴ F⁵ with each other in the relative endwise movement of the two sets of bars the rod F⁴ is located above the level of the rod F² and the adjacent forward ends of the bars F' are cut away so that their upper edges extend beneath the rod F⁴, while at the rear ends of the bars the rod F⁵ is located at the level of the rod F³. The upper edges of the bars F F beneath said rod F⁵ are notched or cut away to clear said rod F⁵, and the rear ends of the bars F' are cut away at their upper edges to clear the rod F³, as clearly seen in Fig. 6. The bars G G and G' G' are similarly connected at their forward and near ends by means of front and rear cross-rods G³ G⁴ and G⁵ G⁶. The rods G³ G⁵ are arranged in the same manner as the rods F² F⁴; but in the case of the rear ends of said bars G G', as clearly seen in Fig. 7, the rod G⁴ is located below the level of the rod G⁶, while the bars G are cut away at their upper margins to pass beneath the rod G⁶, and the rear ends of the bars G' are cut away at their lower margins to pass over the rod G⁴.

Figure 3:
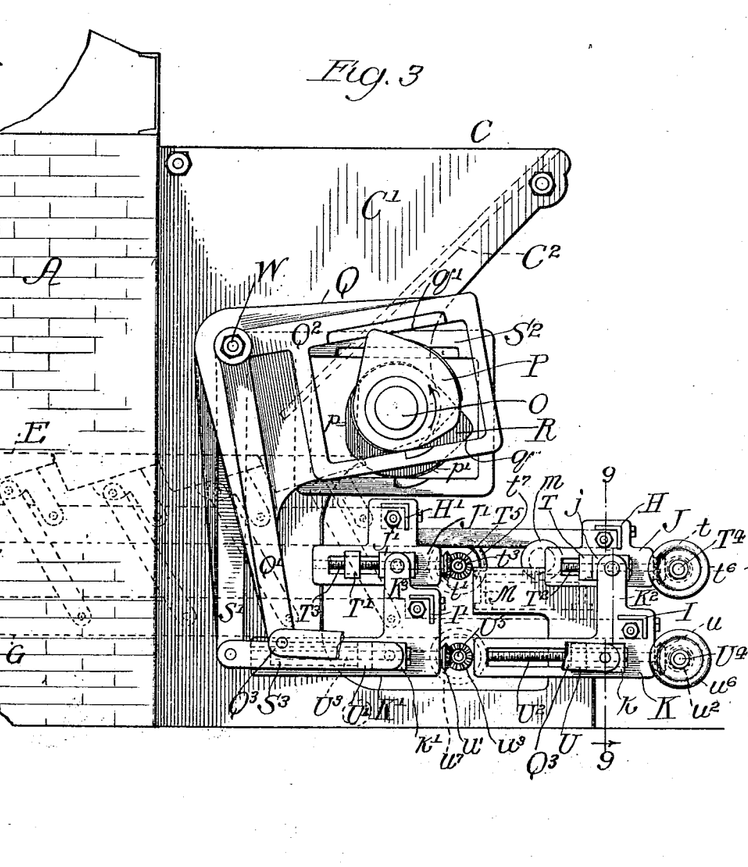
Fig. 3 is an enlarged side elevation of the parts at the front of the furnace through which the grate-bars are actuated.

In the construction illustrated the upper and lower sets of supporting-bars F F' and G G' are given movement by actuating devices located at the sides and front of the furnace, and in order to afford a stiff or rigid connection between the said actuating devices and the several bars constituting the four grids formed in one case by the bars F and rods F² F³, in another case by the bars F' and rods F⁴ F⁵, in another case by the bar G and rods G³ G⁴, and in still another case by the bars G' and rods G⁵ G⁶, devices are provided as follows: H H' are two stiff or rigid metal beams shown as having the form of angle-irons which extend across the front ends of the bars F and F', and I I' are two like beams which extend across the front ends of the bars G G'. The bars H H' are connected with the cross-rods F² F⁴ by means of rings or eyes h, which encircle the thimbles f f at points between the ends of the bars F F' and are provided with forward extensions or stems h', that extend forwardly through holes in the vertical flanges of the beams H H' and are provided on their ends with nuts which bear against the outer or forward faces of the beams, as clearly seen in the detail view, Fig. 8. The beams I I' are connected, by means of like rings i i, with the rods G³ G⁵, as indicated in Fig. 9. The said beams H H' and I I' are extended past the outermost bars F F' G G' of the grids at both sides of the grate and are attached at their ends to metal yoke-pieces J J' and K K', which form part of the actuating devices, by means of which endwise reciprocatory motion is given to the several sets of supporting-bars. The ends of said beams H H' and I I' are shown as attached to the said yoke-pieces by being inserted in the slots or sockets in the yoke-pieces and secured therein by means of set-screws inserted in the yoke-pieces and bearing against the ends of the beams therein, as clearly seen in Fig. 3. The cross-rods F² F⁴ and G³ G⁵, which pass through the forward ends of the bars F F' and G G', are preferably extended through the yoke-pieces J J' and K K' and provided at their ends outside of the said yoke-pieces with clamping-nuts, long thimbles $f'$ $g'$ being interposed between the outermost bars of the sets of bars F F' and G G' and the said yoke-pieces, so that all of said parts may be rigidly clamped together by tightening the nuts on the said rods. These features of construction are clearly shown in the detail view, Fig. 9, in connection with the forward ends of the bars F and G.

Figure 1:
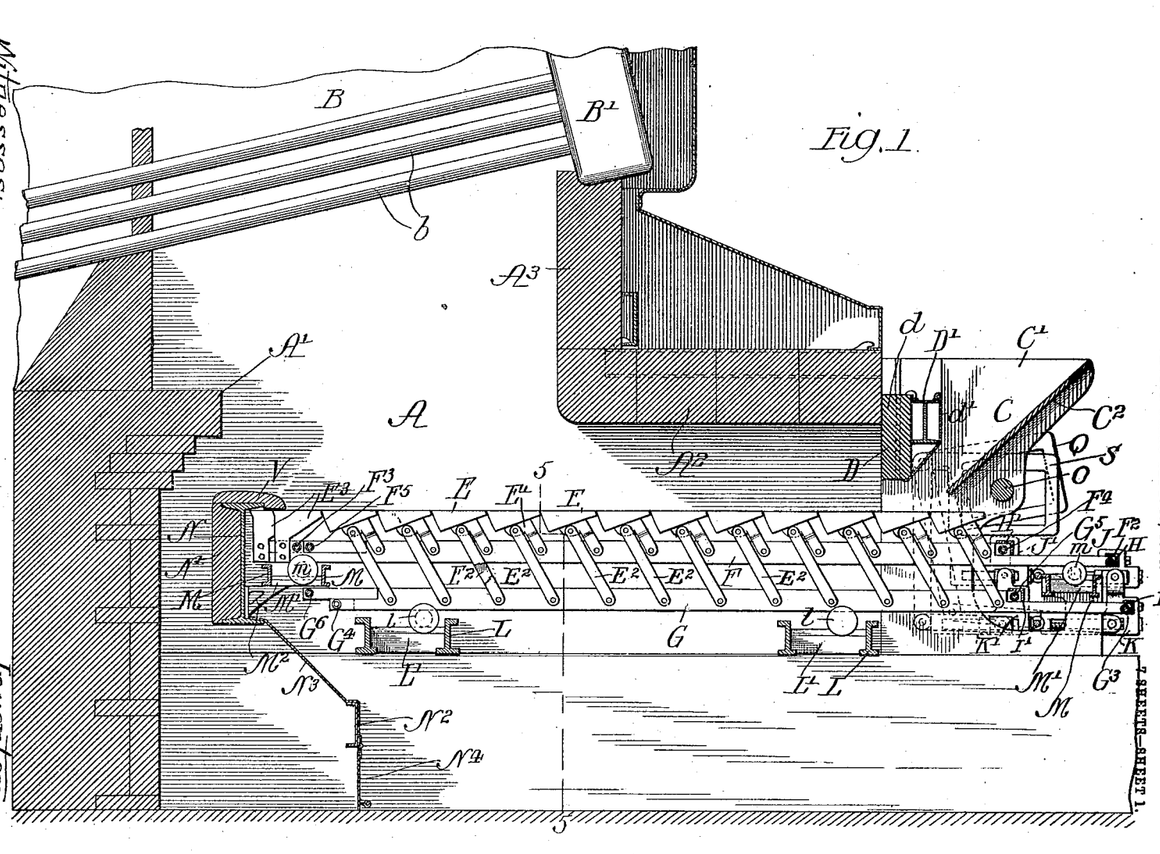
Figure 1 is a view in central longitudinal section of a steam-boiler furnace equipped with a mechanical-stoking grate constructed in accordance with my invention.
Figure 2:
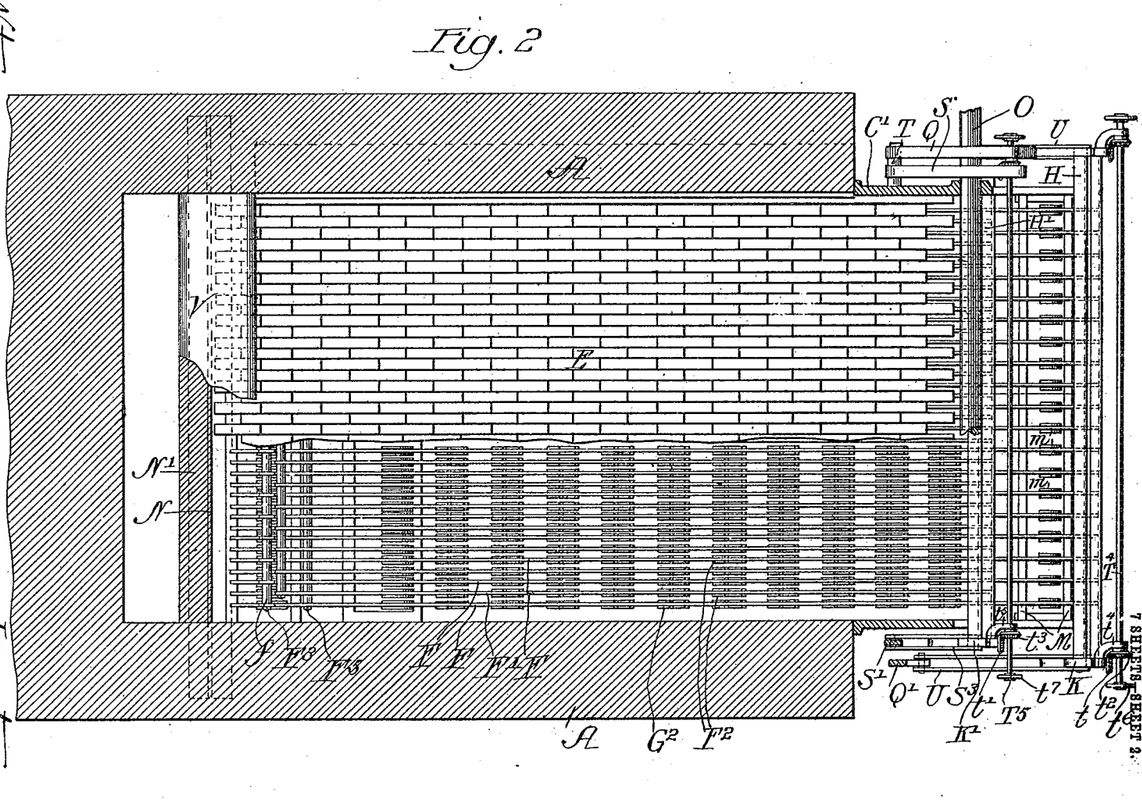
Fig. 2 is a plan view of the furnace-grate and operative parts therefor, the grate-bars constituting the supporting-surface of the grate being in part removed to illustrate the construction of the parts beneath said grate-bars, by which the same are supported.
Figure 4:
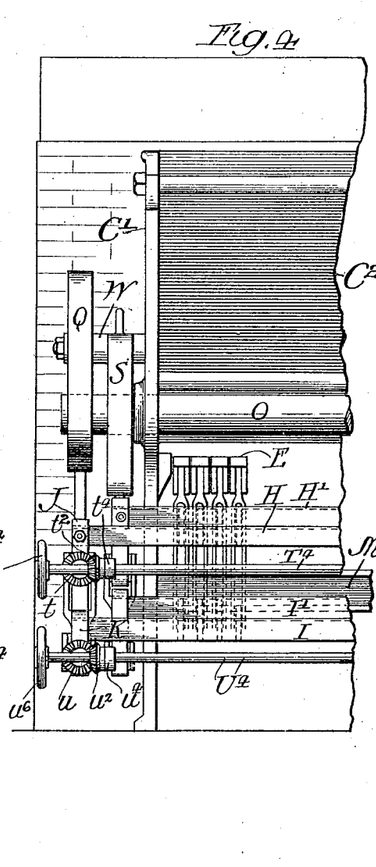
Fig. 4 is a detail front elevation of the devices shown in Fig. 3, showing the actuating devices at one side of the grate.

The four grids formed by the upper and lower sets of bars F F' and G G' or the bars constituting said grids may, so far as the general operation of the grate is concerned, be sustained or supported by any suitable supporting means adapted to sustain them in position under the weight of the fuel on the grate, while permitting them to slide or move freely in an endwise direction. The drawings illustrate supporting devices for said bars, which are constructed as follows: Beneath the forward and rear portions of the lowermost sets of bars G and G' and extending transversely of the furnace are two pairs of parallel beams L L. Between the beams of each pair are arranged longitudinally-extending track-bars L' L', which correspond in number with and are arranged severally beneath the said bars G and G', said track-bars L' L' having the form of thin and wide vertically-arranged plates. Resting upon the upper margins of said track-bars, between the same and the lower margins of the bars G and G', are bearing-rollers $l$ $l$, which are provided with peripheral grooves adapted to receive the upper margins of the track-bars L' L' and the lower edges of the bars G G'. By reason of the grooved construction of the supporting-rollers $l$ $l$ the same are held in engagement both with the track-bars L' L' and with the bars G and G', while the rollers are adapted to move or roll freely on the adjacent margins of the said track-bars and bars G G' as the latter are moved endwise. The upper sets of bars F and F' are similarly supported at their forward and rear ends by means of two pairs of transverse beams M M, longitudinal track-bars M' M', and rollers $m$ $m$. The beams M M at the rear of the furnace are shown as supported by means of brackets $M^2$ from a transverse girder N, which extends across the furnace at the rear of the grate and forward of the bridge-wall A'. The beams M M at the forward ends of the grate are shown as being attached at their ends to the side plates C' C' of the hopper and as extending between the forward ends of the upper and lower sets of supporting-bars, it being of course understood, as seen in the plan view, Fig. 2, and the face view, Fig. 4, that the yoke-pieces J J' and K K', hereinbefore referred to, are located outside of said side plates, so that the presence of the beams M M does not interfere with the movement of said yoke-pieces.

The devices hereinbefore referred to for giving endwise reciprocatory motion to the four sets of supporting-bars F F' and G G' are alike in construction and are arranged in pairs at the forward end of the grate exterior to the side plates of the hopper with one of the devices of each pair at each side of the hopper, one pair of actuating devices being adapted to operate the upper and lower bars F and G, which support one of the two sets of grate-bars, while the other pair acts upon the upper and lower bars F' and G', which support the other of said sets of grate-bars. All four of these devices are operated by means of a single transverse horizontal rotative shaft O, which extends across the front of the furnace above the forward ends of the said supporting-bars, said shaft, as shown, having bearings in the side plates C' C' of the hopper in parts thereof which extend below and forward of the front plate $C^2$ of said hopper. The actuating devices for the supporting-bars F and G consist of double cams P P and associated cam-levers Q Q, located at opposite sides of the feed-hopper, while the actuating devices for the bars F' and G' embrace like double cams R R and cam-levers S S, located inside of the cams P P and cam-levers Q Q. The cams P and R are rigidly attached to the ends of the shaft O, which extend outside of the side plates C' C', and the cam-levers Q and S at each side of the device are mounted on horizontal pivot or bearing studs W, that are rigidly attached to the said side plates C' C' and extend outwardly therefrom. The cam-levers Q and S have open frames $Q^2$ $S^2$, which surround the cams and are provided with depending rigid arms Q' and S', which extend downwardly to the level of the lower sets of bars G and G'. The arms Q' of the levers Q are connected at their lower ends with the yoke-pieces K by means of links $Q^3$, while the arms S' of the cam-levers S are connected at their lower ends with the yoke-pieces K' by means of links $S^3$, Fig. 3. Connections are made between the links $Q^3$ and $S^3$ and the yoke-pieces K and K', adapted to afford lost motion between said yoke-pieces and the cam-levers, consisting of blocks $k$ $k'$, which slide horizontally in guide-slots in the said yoke-pieces K and K' and to which the said links $Q^3$ and $S^3$ are pivoted. The upper yoke-pieces J J', which are connected with the upper sets of supporting-bars F and F', are actuated through the medium of the lower yoke-pieces K and K', which latter are provided with upwardly-extending rigid arms $K^2$ $K^3$, connected at their upper ends with the upper yoke-pieces J J' by means affording lost motion between said parts, consisting of blocks $j$ $j'$, which slide in horizontal guide-slots in the said upper yoke-pieces J and J' and to which the upper ends of said arms $K^2$ $K^3$ are connected, preferably by means of pivot pins or studs, Fig. 3. If the amount of relative movement or lost motion afforded by the sliding of the blocks k k' and j j' in the yoke-pieces K K' and J J' be invariable or constant, the extent of both the endwise or longitudinal movement and of the rocking movement in the grate-bars will remain the same. To provide for variation in such endwise and rocking movements of the grate-bars, I have, however, provided means for varying the extent of sliding movement of said blocks in the yoke-pieces, as follows: T T' are adjustable stop-blocks mounted on the upper yoke-pieces J J' and adapted for contact therewith of the blocks j j' in the rearward movement of said blocks relative to the yoke-pieces, said stop-blocks T T' being arranged to slide in the guide-slots in which said blocks j j' are mounted. U U' are like stop-blocks mounted in the lower yoke-pieces K K' and adapted to limit the rearward movement of the sliding blocks k k' in said yoke-pieces, said stop-blocks U U' being also mounted in the guide-slots of said yoke-pieces. To provide for adjustment of said stop-blocks T T' on the upper yoke-pieces J J', horizontally-arranged screw-shafts $T^2$ $T^3$ are mounted in the forward ends of the yoke-pieces J J' in such manner that they are held from endwise movement in said yoke-piece, said screw-shafts extending through holes formed in the sliding blocks k k', but having screw-threaded engagement with the stop-blocks T T'. Said screw-shafts $T^2$ $T^3$ are provided at their forward ends with beveled gear-pinions t t', adapted to engage beveled gear-wheels $t^2$ $t^3$, attached to operating-shafts $T^4$ $T^5$, which extend across the front of the grate and are mounted in bearing-brackets $t^4$ $t^5$, which are attached to the forward ends of the said yoke-pieces J and J'. Said shafts $T^4$ $T^5$ are provided at their ends with hand-wheels $t^6$ $t^7$, by which the same may be turned to effect the shifting of the stop-blocks T T'. The lower yoke-pieces K K' are similarly provided with adjusting means for the stop-blocks U U', embracing screw-shafts $U^2$ $U^3$, which are mounted to rotate in the yoke-pieces K and K', pass through apertures in the blocks k k' and have screw-threaded engagement with the stop-blocks U U'. Said screw-shafts $U^2$ $U^3$ are provided at their forward ends with gear-pinions u u', which intermesh with beveled gear-wheels $u^2$ $u^3$, attached to operating-shafts $U^4$ $U^5$, mounted in bearing-brackets $u^4$ $u^5$ upon the yoke-pieces K K'. The shafts $U^4$ $U^5$ are provided at their ends with hand-wheels $u^6$ $u^7$, by which the same may be turned to effect the adjustment of the stop-blocks U U'.

Figure 10:
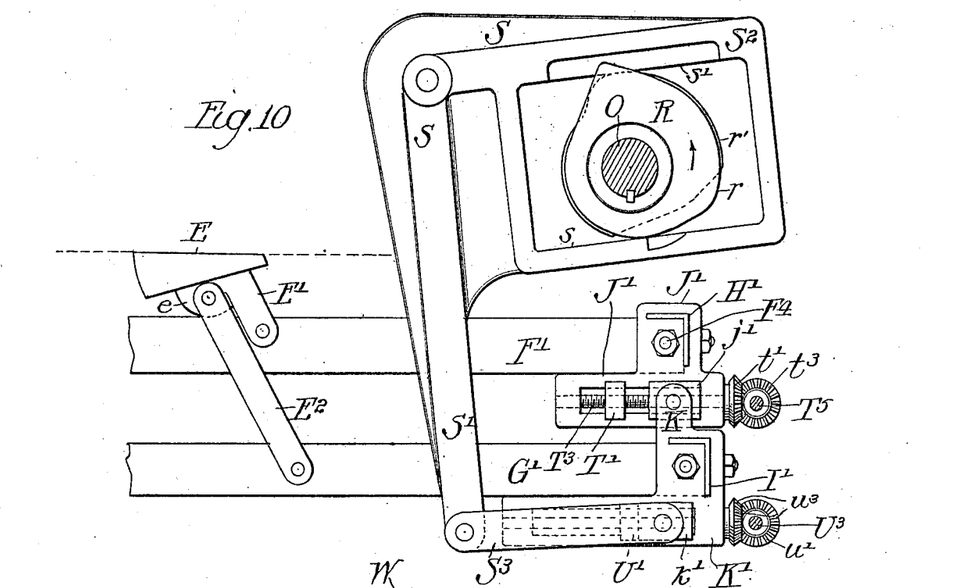
Figs. 10 to 14 are views in side elevation of the grate-bar-actuating devices for one set of grate-bars, illustrating different positions of said parts.
Figure 11:
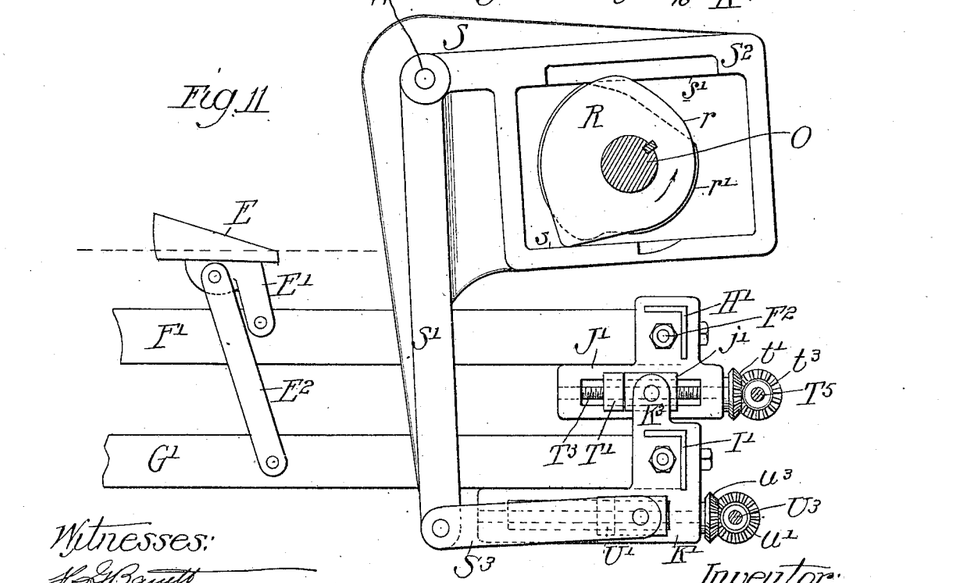
Figure 12:
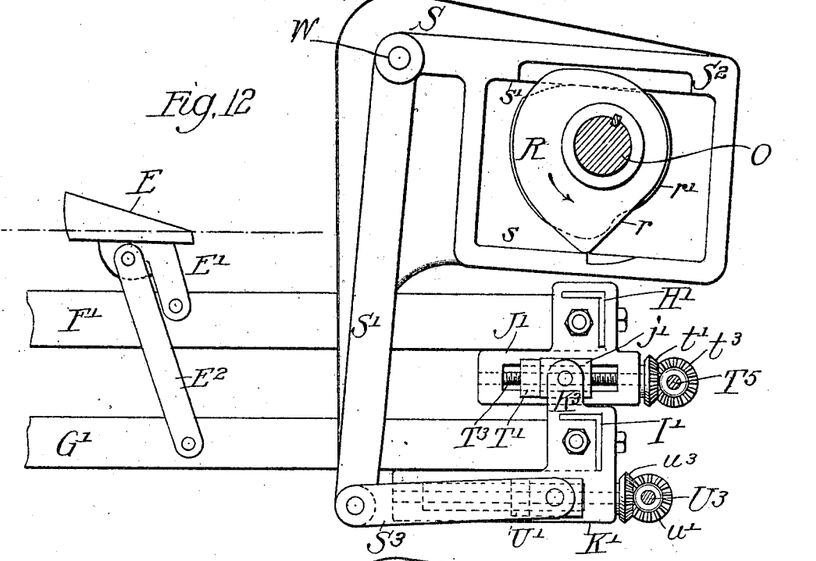
Figure 13:
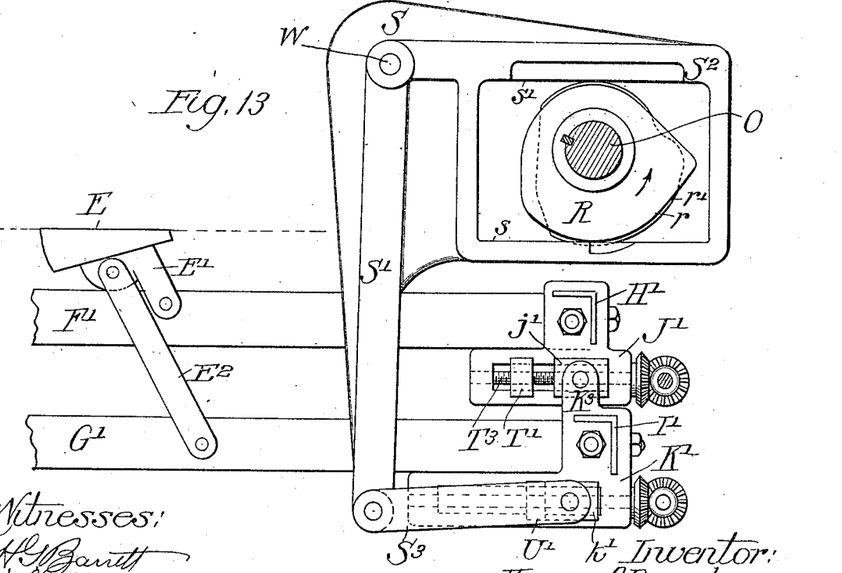

The actuating-cams P and R each have two bearing-surfaces p p' r r' arranged side by side. The frame $Q^2$ of the cam-lever Q is provided with lower and upper arms or members q and q', which extend below and above the cam R and are arranged in offset relation to each other in the planes of the two cam-surfaces p p', the lower part q having an upwardly-facing bearing-surface adapted to engage the cam-surface p and the upper part q' having a downwardly-facing bearing-surface adapted to engage the cam-surface p'. The frame $S^2$ of the cam-lever S likewise has a lower part s, provided with an upwardly-facing bearing-surface adapted to engage the cam-surface r, and an upper part s', having a downwardly-facing cam-surface adapted to engage the cam-surface r', the two cam-faces of the double cam in each case acting on the upwardly and downwardly facing surfaces of the said frame to give properly-timed oscillatory movement to the cam-levers for moving or shifting endwise the upper and lower sets of supporting-bars F and G or F' and G', actuated thereby, as required for giving endwise reciprocatory and rocking movement to the grate-bars The operation of the grate-actuating devices may be better understood by references to Figs. 10, 11, 12, and 13, which show the different positions assumed by the grate-bars in their endwise and rocking movement and the corresponding positions occupied by the supporting-bars, cam-levers, and cams, said figures illustrating the actuating devices for one pair only of upper and lower supporting-bars and showing one of their innermost cams R and cam-levers S and the supporting-bars F' and G', actuated thereby. Fig. 10 illustrates the parts when the grate-bars of the row carried by the supporting-bars F' and G' are in their horizontal or depressed position and at the forward limit of their endwise reciprocatory movement, said bars F' and G' being at this time in their forward or advanced position, while the supporting-arms E' of the grate-bars are rearwardly inclined from their pivots and the links $E^2$ are also rearwardly inclined and substantially parallel with said arms E'. At this time the part of the cam-surface r' which is at the greatest radial distance from its center is acting on the upper part s' of the cam-lever frame $S^2$ to hold the arm S' of the cam-lever S at the forward limit of its movement, while the advance end of a concentric part of the cam-surface r' nearest the center of the cam has just come in contact with the lower part s of said frame. Moreover, the blocks k' j' are at this time at the forward limit of their movement in the yoke-pieces J' and K', and in the turning of the cam R in the direction of the arrow from the position shown in Fig. 10 no movement of the cam-lever takes place until the cam has made part of a revolution, when a projecting part of the cam-surface r which is at the greatest distance from the center of the cam reaches and acts upon the lower part s of the cam-lever frame $S^2$ in such manner as to swing the lower end of the arm S' rearwardly, thereby carrying the lower yoke-piece K' rearwardly without a corresponding movement of the upper yoke-piece J' until the block j', which has considerable lost motion or movement relative to the upper yoke-piece J', strikes the stop-block T' on said upper yoke-piece, after which the upper supporting-bar F' is moved rearwardly with the lower bar G'. The effect of such shifting rearwardly of the lower bar G' is to move the pivots of the links E² rearwardly relatively to the pivots of the supporting-arms E' of the grate-bars, with the effect that the grate-bars are tilted or rocked upwardly and forwardly, so as to lift their rear ends above the general level of the top of the grate without any upward movement of the forward ends of said grate-bars. Fig. 11 illustrates the position of the parts at the time the block j' strikes the stop-block T' on the upper yoke-piece J', the projection of the cam-surface r being now in contact with the lower part s of the cam-lever and in the act of depressing the same, and the rearward movement of the lower bar G' relative to the upper bar F' having been completed the grate-bars have been lifted or tilted forward to their position of greatest elevation. Fig. 12 shows the next step in the movement of the parts, which is the shifting of both bars F' and G' rearwardly to give rearward endwise movement to the elevated grate-bars. In the turning of the cam from the position shown in Fig. 11 to the position shown in Fig. 12 the projecting part of the cam-surface r will throw the lower end of the cam-lever to the rearward limit of its movement, with the effect of moving or shifting both of the bars F' and G' rearwardly from the position shown in Fig. 11, the upper bar F' being carried rearwardly by the action of the block j' on the stop-block T', with which it is at this time in contact. During this movement of the two bars F' and G', the pivots of the supporting-arms E' and the links E² are maintained in the same relative positions, so that the grate-bar is retained in its elevated position, but is moved bodily rearward without any change in its angle or inclination. Further turning of the cam R from the position shown in Fig. 12 carries the projection of the cam-surface r away from the lower part s of the cam-lever frame, while an outwardly-deflected part of the cam-surface r' acts on the upper part s' of the said cam-lever frame to swing the lower end of the cam-lever forwardly, thereby moving forward the lower yoke-piece K' until the block j' reaches the forward limit of its movement on the upper yoke-piece J', as seen in Fig. 13. This forward movement of the lower supporting-bar G' without any corresponding movement of the upper supporting-bar F' has the effect of carrying forward the lower pivots of the links E² and rocking or tilting rearwardly the grate-bars E until their upper edges resume a horizontal position. The grate-bars supported by said bars F' G' have now reached their depressed or horizontal positions but are at the rearward limit of their longitudinal movement. This is the position illustrated in said Fig. 13. Further turning of the cam R from the position shown in Fig. 13 has the effect, through the further action of said outwardly-deflected part of the cam-surface r' on the upper part s of the cam-lever frame, of throwing the arm S' of the cam-lever still further forward, thereby moving forward the lower yoke K' and with it the upper yoke J' and giving corresponding simultaneous forward movement to both of the bars F' and G', with the result that the grate-bars carried thereby are moved forward without any rocking or tilting movement until the parts reach their original positions. (Shown in Fig. 10.)

As illustrated in said Figs. 10 to 13, the stop-block U' of the lower yoke-piece K' is located as near the forward end of the slot in said yoke-piece K' as its capacity for adjustment permits and is therefore in such position as to give practically no lost motion between the sliding block k' and said yoke-piece K', with the result that said yoke-piece K' and the bars G' partake of the entire movement of the lower end of the cam-lever arm S', and the greatest possible endwise movement is given to the bars F' and G' and the several grate-bars carried thereby, and consequent maximum rate of feed or rearward movement in the layer of fuel is produced. If, however, the stop-block U' be adjusted rearwardly, so as to give a greater or less extent of lost motion between the sliding block k' and the yoke-piece K,' then in each rotation of the cam R while the cam-lever will make its full oscillation or stroke the yoke-piece K' will be moved through a distance less than the maximum stroke or movement of the supporting-bars, and the grate-bars carried by such supporting-bars will have a shorter stroke with corresponding reduction in the extent in which the layer of fuel is moved rearwardly in each rearward movement of the elevated grate-bars. Moreover, by shifting or changing the position of the stop-block T' in the upper yoke-piece J' the block j will move a shorter distance from its forward position, as shown in Fig. 10, before it strikes the said stop-block T', and the rearward movement of the lower supporting-bar G' with respect to the upper bar F' will be correspondingly less, so that the grate-bars connected therewith will be moved or tilted upwardly a distance less than the full extent of their capacity for tilting movement, and the layer of fuel will be to a less extent disturbed or agitated than will be the case when the grate-bars are given their full rocking stroke or movement.

It has heretofore been stated that the upper and lower sets of supporting-bars F and G and the rows of grate-bars supported thereon will be moved in alternation with the intermediate sets of bars F' and G' and the rows of grate-bars supported upon the latter, and the operation of the actuating devices for one of the upper sets and the corresponding lower set of supporting-bars, with their associated rows of grate-bars, having been described it may now be added that the two pairs of cams P P and R R are set upon the shaft O in reverse positions with respect to each other, so that the set of upper and associated sets of lower supporting-bars and the rows of grate-bars severally supported thereby are moved alternately or successively, the grate-bars in one set being lifted and moved backwardly during the time that those of the other set are in their depressed position. The general effect of the operation described is that the grate-bars, which are tilted upwardly, and thereby caused to penetrate the layer of fuel above them, in their rearward movement carry with them the layer of fuel, which slides over the top surfaces of the intermediate depressed bars.

While the timing of the movements of the grate-bars, resulting from the particular shape of the cams illustrated, is a desirable one, yet in practice the same may be changed or modified by changing the shape of the cams, so as to give different timing, it being manifest that provided the movements of the grate-bars take place in the order described such movements may take place either simultaneously or successively or in part simultaneously and in part successively, as may be found desirable in practice—that is to say, it is only essential that one set of grate-bars should rise and move rearwardly when the other set embracing the alternate rows of bars are depressed to afford smooth surfaces over which the fuel carried rearwardly with the elevated bars may move or slide and the timing of the supporting grate-bars either be adjusted in such manner that the depressed bars will move forward while the elevated grate-bars are moving rearwardly or so that the depressed grate-bars remain stationary while the said elevated grate-bars are moving rearwardly. It is to be understood, however, that in order to prevent liability of overheating the rear ends of the grate-bars, which are thrown upwardly into the mass of burning fuel when the bars are elevated, it is desirable that the period during which the bars are elevated and are moving backwardly should be as short as possible, and in the case illustrated the cams are so shaped that the elevation, rearward movement, and depression of the bars is quickly accomplished, while the said bars have periods of rest when in their depressed positions or after they are depressed and before they are elevated.

The provision for adjustment of the extent of endwise movement of the grate-bars, together with the extent of rocking or tilting movement thereof, enables the rate of feed of the fuel to be varied and also enables the extent to which the bars are thrown upwardly into the fuel to be changed, so that by the use of the adjusting devices the operation of the grate may be changed to correspond with the conditions required for different kinds of fuel—as, for instance, according to whether the fuel burns rapidly or slowly and whether or not it is liable to cake or coke, and a greater or less rocking movement of the grate-bars is required to break up or agitate the same.

In addition to the features above set forth I have provided means by which the several grate-bars may be removed or detached for a renewal or repairs without disturbing the operative parts of the grate mechanism. For this purpose I have made the grate-bars detachable from the supporting-arms E' thereof by sliding or endwise movement of the bars with respect to the said arms and have provided for adjustment of the actuating devices, so that all of the bars may be tilted or rocked upwardly and forwardly a distance greater than in their usual or normal rocking movement, and so as to bring the lower margins of the rear ends of the bars above the front ends of the adjacent bars, and thus permit any bar to be disengaged from its supporting-arm.

Means affording detachable connection of the bars E with the arms E' is provided, as shown in Figs. 15 to 18, as follows: The lug $e$, to which the link $E^2$ is pivoted, as before stated, is made integral with the upper end of the supporting-arm E' and has the form of a rearward extension of the upper end of said arm, and on the upper margin of the arm and lug is formed a dovetailed rib $e'$. The grate-bar E is provided on its under surface with a longitudinal groove $e^2$, of dovetail form, adapted to receive said rib $e'$. Said groove $e^2$ is closed at its rear end, or that adjacent to the rear end of the bar E, by means of a transverse wall or stop projection $e^3$, Fig. 15; but the said groove is open at the forward end of the grate-bar. As a result of this construction the grate-bars can be engaged with the arms E' by sliding them forward on the ribs $e'$ and disengaged from said arms by drawing them rearwardly from said ribs. If, therefore, the grate-bars be tilted forwardly and upwardly far enough to bring their rear ends above the front ends of adjacent bars, the said bars thus detachably connected with the arms E' may be severally drawn rearwardly and disengaged from said arms. The actuating devices illustrated are adapted for throwing the grate-bars upwardly and forwardly into the position described, as will be hereinafter set forth.

Figures 14, 15, 16, 17, 18:
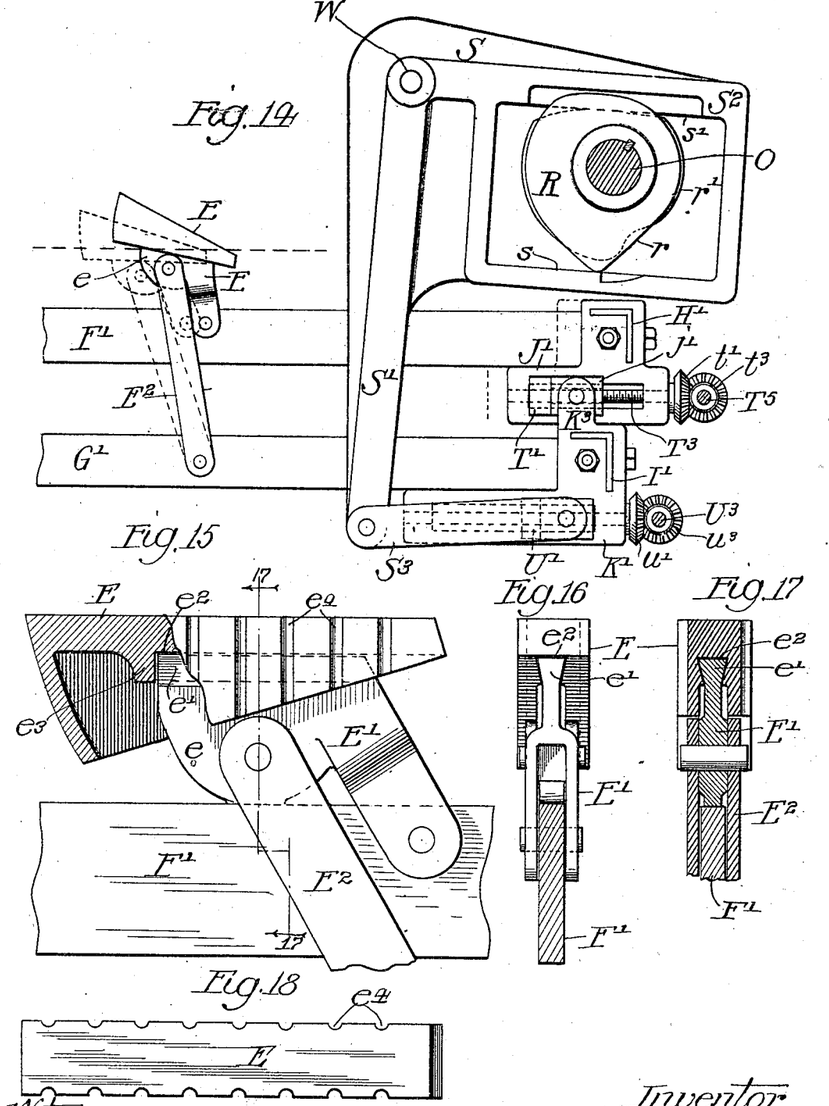
Fig. 15 is an enlarged detail side view, with parts in section, of one of the grate-bars and the supporting-arm by which it is immediately sustained, this figure illustrating certain details of construction in these parts not shown in the preceding several views.
Fig. 16 is an end view of the parts shown in Fig. 15.
Fig. 17 is a detail cross-section taken on line 17 17 of Fig. 15.
Fig. 18 is a plan view of the grate-bar shown in Figs. 15, 16, and 17.

The rear ends or edges of the grate-bars are so shaped or curved that as each bar swings upwardly its said rear edge will remain at a uniform distance from the front end of the adjacent bar at the rear of it, so that no spaces large enough for the entrance of pieces of coal or clinkers will be left between the ends of the lifted bars. Inasmuch as the bars are made of such depth or width at their rear ends that when rocked forwardly their rear edges will extend below the top surfaces of the front ends of adjacent bars, as hereinbefore stated, in the usual position of the parts all of said bars will be locked from rearward movement on the arms E' by the presence of the front ends of adjacent bars at the rear of them, and none of the bars can be removed or disengaged from the arms E' except by an unusual movement of the bars, by which their rear ends are brought above such forward ends of the bars at the rear of them. Such unusual position of the bars required to permit the removal thereof is called the "repair" position, and the bars are brought into this position, as shown in Fig. 14, by giving endwise movement to the lower with respect to the upper sets of supporting-bars F F' and G G' greater than is required for tilting or rocking the grate-bars in the usual operation of the grate. This is effected by adjustment of the stop-blocks T T' inwardly or rearwardly far enough to give such an extent of lost motion between the upper yoke-piece J' and the upper yoke-piece K' as to produce the desired result. As shown in Fig. 14, the dotted lines indicate the position of the parts when the grate-bars are elevated preparatory to their rearward movement in the usual operation of the grate, while the full lines show the position assumed by the parts when the stop-blocks T' are especially adjusted inward to bring the grate-bars into the repair position, the supporting-bar G' at this time being moved so far inwardly with respect to the supporting-bar F' as to lift the rear ends of the grate-bars above the general level of the top of the grate.

In order to insure that all of the grate-bars shall be brought, when depressed, into position with their upper surfaces in the same plane, I so shape the lugs e that they will come in contact with the adjacent top surface of the bars F F' below them when the said grate-bars are tilted rearwardly or depressed, as clearly seen in Fig. 15.

It will of course be understood that the grate-bars E will be spaced at such distance apart laterally or provided with spaces between them of sufficient area to afford a suitable supply of air to the layer of fuel resting on the grate. Said grate-bars may, however, be made of such width as to leave relatively narrow spaces between them and notched or grooved at their side faces to provide for a suitable air-supply. A construction of this kind is shown in the detail views, Figs. 15 to 18, the bars being made of rectangular shape, as seen in plan view, and so wide as to leave only a slight space between the bars of adjacent rows, while the side faces of the bars are provided with vertical grooves or notches $e^4$ $e^4$, affording channels or passages for the upward passage of air between the said bars.

As a further improvement in mechanical-stoking grates of the general character hereinbefore described I have provided a construction at the rear end of the grate as follows: The girder N, which extends across the rear end of the grate, as hereinbefore stated, serves as a support for a transversely-extending row of fire-brick or tile V, which project forwardly from the said girder so as to overhang the rear end of the grate. The grate is, moreover, provided at its rear end with auxiliary grate-bars $E^3$ $E^3$, which are rigidly attached to the upper supporting-bars F and F' and are made of the same width as the grate-bars E E and are arranged in alinement therewith with their upper surfaces in the same plane with the top surfaces of said grate-bars E E when the latter are depressed. The bars $E^3$ $E^3$ being attached to the upper series of supporting-bars F F', they move with the latter in their endwise reciprocatory movements. Said blocks $E^3$ $E^3$ extend beneath the overhanging front edges of the fire-brick or tiles V. The said auxiliary grate-bars $E^3$ $E^3$ are shown as attached to the rear ends of the bars F and F' by means of downwardly-extending rigid shanks on the rear ends of the bars, which are slotted to receive, and are riveted to, the rear ends of said bars. The upper surfaces of the auxiliary bars $E^3$ $E^3$ are located nearly in contact with the lower surfaces of the overhanging fire-brick V, so that close joints, preventing the passage of ashes between said parts, will be maintained between the upper surfaces of said auxiliary bars and said fire-brick. Said fire-brick are preferably beveled or rounded at their forward and upper surfaces, so as to present an inclined or rounded surface over which the ashes and clinkers and the burned-out fuel will pass when the same are carried against the forward edges of the fire-brick in the rearward movement of the layer of fuel on the grate. The girder N is located far enough forward from the front surface of the bridge-wall A' to afford a vertical space or opening through which ashes discharged from the grate over the fire-brick V may fall into the ash-pit. To protect the rear or inner face of the girder N, which is preferably made with a central web and top and bottom horizontal flanges, a lining N' of fire-brick is preferably applied to the inner surface of said girder, the same resting on the lower horizontal flange thereof. The row of fire-brick V, extending across the rear end of the grate and rising slightly above the same, forms a ridge or ledge which obstructs or retards the rearward movement of the layer of ashes as the same approaches the rear end of the grate, so as to crowd together, concentrate, or render more compact said layer, and thus restrict the passage of air through the burned-out or nearly burned-out portion of the layer of fuel resting on the rear part of said grate. In the operation of grates of this kind it is of course intended that the rearward feed of the layer of fuel on the grate should be at such rate that the combustion of fuel in the layer will be completed at the time the fuel reaches the rear end of the grate, because if the combustion be not completed at such time a part of the fuel will pass from the rear end of the grate in an unconsumed state, while if the combustion be completed before the fuel reaches the rear end of the grate the entire grate-surface will not be utilized for heating purposes. An effort will usually be made to so adjust the rate of feed or rearward movement of the layer of fuel that all of the fuel will be burned just before the rear end of the grate is reached; but in such case a comparatively thin layer of burned-out fuel or ashes will be present on the rear end portion of the grate, through which air is likely to pass with greater freedom than through the unconsumed portion of the layer of fuel, with the result of lessening the draft through such unconsumed portion. When the ridge formed by the row of fire-brick V V is present, however, the rearward movement of the ashes will be retarded and the same will be pressed or forced against the front of the said ridge, with the result that the layer will at this point be compressed and thickened, so as to nearly or entirely prevent the passage of air therethrough, thereby insuring the passage of practically all of the air through the portions of the layer of fuel in which combustion is taking place.

Provision is made to prevent passage of air upwardly through the passage between the girder N and the bridge-wall, consisting in the instance illustrated of a girder N², extending across the ash-pit below the grate at some distance forward of the girder N, a plate N³, extending from the lower edge of said girder downwardly to the top of the girder N², and a closing-plate or damper N⁴, which is hinged at its upper edge to the girder N² and which when it hangs vertically reaches to the bottom of the ash-pit. The space between the bridge-wall A' and the plates N³ N⁴ constitute a receptacle in which the ashes accumulate as they fall, the plate N⁴ being adapted to be swung upwardly or opened to permit the removal of such ashes.

I claim as my invention—

1. A grate embracing at least two rows of grate-bars arranged side by side and means for giving rocking and bodily reciprocatory motion to the grate-bars of each row of grate-bars adapted to elevate and move rearwardly the grate-bars of one row during the time the grate-bars of the other row are depressed.

2. A grate embracing a set of rocking and endwise-movable grate-bars, the rear ends of which are adapted to rise and fall in the rocking movement thereof, and means for giving rocking and endwise-reciprocatory motion to said grate-bars adapted to shift the said bars rearwardly when their rear ends are elevated and to move them forwardly when their rear ends are depressed.

3. A grate embracing a set of rocking and endwise-movable grate-bars, the rear ends of which rise and fall in the rocking movement thereof and which are arranged in parallel rows with the bars of each row in end-to-end relation, and means for giving both rocking and reciprocatory motion to said grate-bars adapted to shift the said grate-bars rearwardly when their rear ends are elevated and to move them forwardly when said rear ends are depressed.

4. A grate embracing two sets of grate-bars, the grate-bars in each set being arranged in parallel rows with the grate-bars of each row in end-to-end relation, the rows of bars of one set being arranged in alternation with the rows of bars of the other set, and means for giving rocking and bodily reciprocatory motion to said bars, adapted to effect the shifting of the bars of each set rearwardly when their rear ends are elevated and when the rear ends of the bars of the other set are depressed.

5. A grate embracing a set of grate-bars which are severally mounted to swing or rock on pivots located below the forward ends of the same so as to rise and fall at their rear ends, and means for giving rocking and endwise-reciprocatory motion to said bars.

6. A grate embracing a row of grate-bars arranged end to end, each of said bars being mounted to rock or tilt on an axis located below its forward end and to rise and fall at its rear end, said bars being made of greater depth at their rear ends than the vertical throw of such rear ends, and means for giving both rocking and endwise-reciprocatory motion to said bars.

7. A grate embracing a row of grate-bars arranged end to end, each of said bars being mounted to rock or tilt on an axis located below its forward end and to rise and fall at its rear end, said bars being curved at their rear ends, and means for giving both rocking and endwise-reciprocatory motion to said bars.

8. A grate comprising a row of grate-bars, two endwise-movable supporting-bars, means operated by the relative endwise movement of said supporting-bars for giving rocking movement to said grate-bars, and means for giving endwise-reciprocatory motion to said supporting-bars adapted to give greater extent of movement to one supporting-bar than to the other.

9. A grate comprising a row of grate-bars, two supporting-bars, depending rigid arms on the several grate-bars pivoted to one of the said supporting-bars, links pivoted at their upper ends to the several grate-bars and at their lower ends to the other of said supporting-bars, and means for giving endwise-reciprocatory motion to said supporting-bars and for moving one of said bars relative to the other bar.

10. A grate comprising a row of grate-bars, an upper and a lower supporting-bar located in vertical alinement, a depending rigid arm on each grate-bar pivoted to the upper supporting-bar, two links pivoted at their upper ends to each grate-bar and at their lower ends to the lower supporting-bar and which extend at opposite sides of the said upper supporting-bar, and actuating means for giving endwise movement to said supporting-bars.

11. A grate comprising a row of grate-bars, two supporting-bars, to one of which the several grate-bars are pivoted, links pivoted at their upper ends to the several grate-bars and at their lower ends to the other of said supporting-bars, connecting means between the said supporting-bars by which one of said bars is moved by the other bar and which affords lost motion between the said bars, and actuating means for giving endwise-reciprocatory motion to one of the supporting-bars.

12. A grate embracing a row of rocking and endwise-movable grate-bars, upper and lower supporting-bars located beneath said grate-bars, said grate-bars being pivoted at their forward ends to the upper supporting-bar, links pivotally connected at their upper ends with the grate-bars at points rearward of the front ends of the latter, and at their lower ends with the lower supporting-bar, connections between said supporting-bars by which the upper supporting-bar is actuated from the lower supporting-bar, constructed to afford lost motion between said supporting-bars, and means acting on the lower bar to give endwise-reciprocatory motion thereto.

13. A grate embracing a row of rocking and endwise-movable grate-bars, two supporting-bars located beneath said grate-bars, said grate-bars being pivoted to one of said supporting-bars, links pivotally connected at their upper ends with the grate-bars and at their lower ends with the other supporting-bar, connections by which the upper supporting-bar is actuated from the lower bar constructed to afford lost motion between said supporting-bars, and means acting on the lower bar to give endwise-reciprocatory motion thereto, embracing an oscillating cam-lever, and a rotative cam acting thereon.

14. A grate embracing two sets of rocking and endwise-movable grate-bars, the bars of each set being arranged in parallel rows with the rows of one set in alternation with those of the other set, two sets of upper and two sets of lower endwise relatively movable supporting-bars, connections between said supporting-bars and the grate-bars by which the grate-bars are rocked through relative endwise movement of the upper and lower sets of supporting-bars, means rigidly connecting with each other at their ends the supporting-bars constituting each set to form grids, and means acting on the said grids to give endwise-reciprocatory movement to said upper and lower sets of supporting-bars.

15. A grate embracing two sets of rocking and endwise-movable grate-bars, the bars of each set being arranged in parallel rows with the rows of one set in alternation with those of the other set, two sets of upper and two sets of lower endwise relatively movable supporting-bars, said grate-bars being pivotally connected with the bars of the upper sets of supporting-bars, links connecting said grate-bars with the bars of the lower sets of supporting-bars, means rigidly connecting with each other the supporting-bars constituting each set to form grids, and means acting on the said grids to give endwise-reciprocatory movement to said upper and lower sets of supporting-bars.

16. A grate comprising a row of rocking and endwise-movable grate-bars, two supporting-bars with one of which said grate-bars are pivotally connected, links pivoted at their upper ends to the several grate-bars and at their lower ends to the other supporting-bar, connections between said supporting-bars by which one of said bars is moved by the other bar, affording lost motion between said bars, means for varying the extent of lost motion between said supporting-bars, actuating means for giving endwise movement to one of said supporting-bars, and connections between said actuating means and the supporting-bar operated thereby, affording lost motion between said actuating means and said bar, and means for varying the extent of lost motion between said actuating means and the said bar.

17. A grate comprising a row of rocking and endwise-movable grate-bars, upper and lower supporting-bars, the said grate-bars being pivoted to the upper supporting-bar, links pivoted at their upper ends to the grate-bars and their lower ends to the lower supporting-bar, connections between the said supporting-bars by which the upper bar is actuated by the lower bar, affording lost motion between the bars, means for varying the extent of lost motion between the bars, and means acting on the lower supporting-bar for giving endwise movement to the same.

18. A grate comprising a row of rocking and endwise-movable grate-bars, upper and lower supporting-bars located beneath said grate-bars, said grate-bars being pivoted to the upper supporting-bar, links pivoted at their upper ends to the grate-bars and at their lower ends to the lower supporting-bar, connections between said supporting-bars by which the upper bar is actuated from the lower bar, affording lost motion between said bars, means for varying the extent of lost motion between the bars, actuating means for giving endwise movement to the lower bar and connections between said actuating means and the said lower bar affording lost motion between said actuating means and said lower bar, and means for varying the extent of lost motion between said actuating means and said lower bar.

19. A grate comprising a set of rocking and endwise-movable grate-bars, a set of upper and a set of lower endwise relatively movable supporting-bars, the supporting-bars constituting each set being rigidly connected with each other to form a grid, means operated by the relative endwise movement of said upper and lower sets of supporting-bars for giving rocking movement to said grate-bars, pairs of associated upper and lower yoke-pieces, the upper yoke-piece of each pair being attached to the upper grid and the lower yoke-piece of each pair being attached to the lower grid, and the upper yoke-pieces having limited movement with respect to the lower yoke-pieces to afford lost motion between said grids, actuating means connected with the lower yoke-pieces to give endwise-reciprocatory motion to the same, and an adjustable stop upon one of the yoke-pieces of each pair of associated yoke-pieces adapted for contact with the other yoke-piece of the pair for varying the extent of lost motion between said upper and lower grids.

20. A grate comprising a set of rocking and endwise-movable grate-bars, a set of upper and a set of lower endwise relatively movable supporting-bars, the supporting-bars constituting each set being rigidly connected with each other to form a grid, means operated by the relative endwise movement of said upper and lower sets of supporting-bars for giving rocking movement to said grate-bars, pairs of associated upper and lower yoke-pieces, the upper and lower yoke-pieces of each pair being attached respectively to said upper and lower grids and having limited longitudinal movement with respect to each other to afford lost motion between said grids, actuating means connected with the lower yoke-pieces of each pair to give endwise-reciprocatory motion to the same, an adjustable stop upon one of the yoke-pieces of each pair of associated upper and lower yoke-pieces for varying the extent of lost motion between said upper and lower grids, sliding connections between said actuating means and the lower yoke-pieces, affording lost motion between said actuating means and said yoke-pieces, and adjustable stops on said lower yoke-pieces for varying the extent of such lost motion between the same and said actuating means.

21. The combination with a set of rocking and endwise-movable grate-bars, a set of upper and a set of lower endwise relatively movable supporting-bars, the supporting-bars in each set being rigidly connected with each other to form a grid, means operated by the relative endwise movement of the upper and lower grids for giving rocking movement to said grate-bars, pairs of associated upper and lower yoke-pieces the upper yoke-piece of each pair being attached to the upper grid and the lower yoke-piece of each pair being attached to the lower grid, a sliding stop on one of the yoke-pieces of each pair, limiting the movement of said yoke-pieces relatively to each other, and a screw-shaft mounted on the yoke-piece provided with said adjustable stop adapted to engage and move the latter.

22. The combination with two sets of rocking and endwise-movable grate-bars, of two sets of upper and two sets of lower endwise relatively movable supporting-bars, the supporting-bars of each set of such bars being rigidly connected with each other to form grids, means operated by the relative endwise movement of the upper and lower sets of supporting-bars for giving rocking movement to said grate-bars, pairs of associated yoke-pieces, the upper yoke-piece of each pair being attached to one of the upper grids and the lower yoke-piece of each pair being attached to one of the lower grids, said yoke-pieces on the upper grids having limited longitudinal movement with respect to those on the lower grids affording lost motion between said upper and lower grids, an adjustable stop on one of each pair of associated upper and lower yoke-pieces for varying the extent of lost motion between the upper and lower grids, and actuating means embracing a rotative shaft, cams on said shaft and associated cam-levers connected with one of the yoke-pieces of each pair.

23. The combination with two sets of rocking and endwise-movable grate-bars, of two sets of upper and two sets of lower endwise relatively movable supporting-bars, the supporting bars of each set of such bars being rigidly connected with each other to form a grid, means operated by the relative endwise movement of the upper and lower sets of supporting-bars for giving rocking movement to said grate-bars, pairs of associated yoke-pieces, the upper yoke-piece of each pair being attached to one of the upper grids and the lower yoke-piece of each pair being attached to one of the lower grids, said yoke-pieces on the upper grids having limited longitudinal movement with respect to those on the lower grids affording lost motion between said upper and lower girds, an adjustable stop on one of each pair of upper and lower yoke-pieces for varying the extent of lost motion between the upper and lower grids, actuating means connected with one of the yoke-pieces of each upper and lower pair, screw-shafts mounted on the yoke-pieces carrying said adjustable stops and having screw-threaded engagement with said stops, and a transverse shaft mounted on the yoke-pieces carrying said stops and connected by gearing with said screw-shafts.

24. The combination with a set of rocking and endwise-movable grate-bars, of two sets of upper and two sets of lower endwise relatively movable supporting-bars, the bars of each set being rigidly connected with each other to form a grid, pairs of associated upper and lower yoke-pieces, the upper yoke-piece of each pair being attached to the upper grid, and the lower yoke-piece of each pair being attached to the lower grid, sliding blocks on the upper yoke-pieces which are connected with and move with the lower yoke-pieces, adjustable stop-blocks on the upper yoke-pieces for limiting the movement of said sliding blocks thereon, screw-shafts mounted on said upper yoke-pieces and engaging said stop-blocks for adjusting the position of the same, sliding blocks mounted on the lower yoke-pieces of each pair, actuating means connected with said sliding blocks on the lower yoke-pieces, stop-blocks on said lower yoke-pieces for limiting the movement of said sliding blocks with respect thereto, screw-shafts mounted on said lower yoke-pieces for adjusting said stop-blocks, and actuating-shafts mounted one on the upper and the other on the lower yoke-pieces and connected by gearing with said screw-shafts.

25. The combination with a row of rocking and endwise-movable grate-bars, of two supporting-bars located vertically beneath the same, depending rigid arms on the several grate-bars which are pivoted to the upper supporting-bar, links pivoted at their upper ends to the several grate-bars and at their lower ends to the lower supporting-bar, upper and lower yoke-pieces connected and moving with said upper and lower supporting-bars respectively, a sliding block on the upper yoke-piece, which is connected and moves with the lower yoke-piece and which has limited longitudinal movement on the upper yoke-piece to afford lost motion between said yoke-pieces, an adjustable stop on the upper yoke-piece for varying the extent of lost motion between the said upper and lower yoke-pieces, a sliding block on the lower yoke-piece, actuating means connected with said sliding block, and an adjustable stop on the lower yoke-piece affording a variable extent of lost motion between the actuating devices and said lower yoke-piece.

26. A grate comprising a row of grate-bars, upper and lower supporting-bars, depending rigid arms on the grate-bars which are pivoted at their lower ends to the upper supporting-bar, and links pivoted at their upper ends to the several grate-bars and at their lower ends to the lower supporting-bar, said arms having at their upper ends lateral extensions or lugs to which the said links are pivoted and being detachably connected at said upper ends with the said grate-bars.

27. A grate comprising a row of rocking and endwise-movable grate-bars, upper and lower supporting-bars, depending rigid arms on the several grate-bars which are pivoted to the upper supporting-bar, and links pivoted at their upper ends to the several grate-bars and at their lower ends to the lower supporting-bar, said arms on the grate-bars having lateral extensions or lugs to which the said links are pivoted and being detachably connected with the said grate-bars by means of dovetail connections permitting separation of said parts by longitudinal movement of the bars relative to the said arms.

28. A grate comprising a set of rocking and endwise-movable grate-bars, upper and lower supporting-bars, depending rigid arms on the grate-bars which are pivoted at their lower ends to the upper supporting-bars, links pivoted at their upper ends to the grate-bars and at their lower ends to the lower supporting-bars, said arms on the grate-bars having lateral extensions or lugs to which the said links are pivoted and being detachably connected with the said grate-bars by means of interlocking connections permitting separation of said parts by longitudinal movement of the grate-bars relative to the said arms, and means for giving endwise movement to the upper and lower supporting-bars embracing adjusting means adapted for bringing said supporting-bars into such relative position that the rear ends of the grate-bars are lifted above the forward ends of adjacent bars to permit the removal of said grate-bars from the said arms.

29. The combination with a grate embracing grate-bars which have rocking and endwise-reciprocatory motion to effect the rearward movement of fuel on the grate of a ridge or ledge of refractory material overhanging the rear end of the grate and adapted for the passage thereover of the ashes or burned-out portions of the fuel.

30. The combination with a grate embracing grate-bars having rocking and longitudinal reciprocatory motion to effect the rearward movement of the fuel on the grate, of a supporting-girder located at the rear of the grate, and a ledge or ridge of refractory material supported on said girder and overhanging the rear end of said grate.

31. A grate embracing two sets of rocking and endwise-movable grate-bars, arranged in parallel rows with the rows of one set in alternation with those of the other set, means for supporting and actuating said grate-bars, embracing two sets of parallel supporting-bars, auxiliary grate-bars rigidly attached to the rear ends of said supporting-bars, and a stationary ridge or ledge located at the rear of the grate and overhanging the rear margin of the same.

32. A grate embracing two sets of grate-bars arranged in parallel rows with the rows of one set in alternation with those of the other set, means for supporting said grate-bars embracing parallel supporting-bars with which the grate-bars are movably connected, auxiliary grate-bars rigidly attached to the rear ends of said supporting-bars, a supporting-girder at the rear of the grate and a ridge or ledge of refractory material supported on said girder and overhanging the rear margin of the grate.

33. A grate embracing two sets of grate-bars arranged in parallel rows with the rows of one set in alternation with those of the other set, upper and lower sets of endwise-movable supporting-bars by which the grate-bars are sustained and actuated, and means for sustaining said supporting-bars comprising transverse girders located below the upper and lower sets of supporting-bars, track-rails attached to said transverse girders and arranged longitudinally beneath the several bars, and supporting-rollers engaging the said stationary track-rails and the lower edges of said supporting-bars.

34. A grate comprising a row of rocking and endwise-movable grate-bars arranged in end-to-end relation, and supporting-arms detachably connected with said grate-bars by interlocking connections permitting separation of said parts by endwise movement of the bars relatively to the arms, said bars being arranged for endwise engagement in their normal rocking movement, but being capable of abnormal rocking movement to release them from each other and permit their removal from said arms.

In testimony that I claim the foregoing as my invention I affix my signature, in presence of two witnesses, this 15th day of September, A. D. 1904.

HERMAN A. POPPENHUSEN.

Witnesses;
C. CLARENCE POOLE,
W. L. HALL.